(12) United States Patent
Kimura et al.

(10) Patent No.: US 8,072,168 B2
(45) Date of Patent: *Dec. 6, 2011

(54) POSITION DETECTING APPARATUS HAVING ELECTRIC MOTOR AND METHOD FOR DETECTING POSITION

(75) Inventors: Kiyoshi Kimura, Obu (JP); Taku Itoh, Chita-gun (JP); Shigeru Yoshiyama, Kariya (JP); Masashi Hori, Anjo (JP)

(73) Assignees: Denso Corporation, Kariya, Aichi-Pref. (JP); Nippon Soken, Inc., Nishio, Aichi-Pref. (JP)

( * ) Notice: Subject to any disclaimer, the term of this patent is extended or adjusted under 35 U.S.C. 154(b) by 31 days.

This patent is subject to a terminal disclaimer.

(21) Appl. No.: 12/591,138

(22) Filed: Nov. 10, 2009

(65) Prior Publication Data

US 2010/0052595 A1 Mar. 4, 2010

Related U.S. Application Data

(62) Division of application No. 12/232,500, filed on Sep. 18, 2008, now Pat. No. 7,635,961, which is a division of application No. 11/318,529, filed on Dec. 28, 2005, now Pat. No. 7,446,499.

(30) Foreign Application Priority Data

Dec. 28, 2004 (JP) .................................. 2004-381753

(51) Int. Cl.
*G05B 5/00* (2006.01)
(52) U.S. Cl. ......... 318/466; 318/445; 318/560; 318/626

(58) Field of Classification Search .................. 318/445, 318/466, 560, 626
See application file for complete search history.

(56) References Cited

U.S. PATENT DOCUMENTS

| 4,707,650 | A | 11/1987 | Bose |
| 6,246,193 | B1 | 6/2001 | Dister |
| 6,580,236 | B2 | 6/2003 | Mitsuda |
| 6,676,400 | B2 | 1/2004 | Ito |
| 6,911,798 | B2 | 6/2005 | Hori et al. |
| 6,992,451 | B2 | 1/2006 | Kamio et al. |

(Continued)

FOREIGN PATENT DOCUMENTS

JP 01-264747 10/1989
(Continued)

OTHER PUBLICATIONS

Japanese Office Action dated Mar. 30, 2010, issued in corresponding Japanese Application No. 2004-381753, with English translation.

*Primary Examiner* — Walter Benson
*Assistant Examiner* — Kawing Chan
(74) *Attorney, Agent, or Firm* — Nixon & Vanderhye PC

(57) ABSTRACT

A reference position detecting apparatus includes an electric motor and a motor control unit. The electric motor includes a plurality of first coils and a plurality of second coils. The electric motor further includes a rotor that rotates when at least one of the plurality of first coils and the plurality of second coils is supplied with electricity. The motor control unit controls electricity supplied to either one of the plurality of first coils and the plurality of second coils to rotate the rotor to a limit position in a movable range of an object.

6 Claims, 13 Drawing Sheets

U.S. PATENT DOCUMENTS

| | | |
|---|---|---|
| 7,084,597 B2 | 8/2006 | Nakai et al. |
| 7,161,314 B2 * | 1/2007 | Nakai et al. ............... 318/400.4 |
| 7,221,116 B2 | 5/2007 | Nakai et al. |
| 7,265,505 B2 * | 9/2007 | Nakai et al. ............. 318/400.09 |
| 7,323,834 B2 | 1/2008 | Kimura et al. |
| 7,446,499 B2 | 11/2008 | Kimura et al. |
| 7,609,012 B2 | 10/2009 | Kamio et al. |
| 2003/0042863 A1 * | 3/2003 | Miyata et al. ................. 318/700 |
| 2004/0066165 A1 * | 4/2004 | Kamio et al. ................. 318/701 |
| 2005/0258788 A1 | 11/2005 | Mori et al. |
| 2006/0033464 A1 * | 2/2006 | Nakai et al. ................... 318/701 |
| 2006/0197489 A1 | 9/2006 | Nakai et al. |
| 2009/0039822 A1 | 2/2009 | Kimura et al. |
| 2009/0193923 A1 | 8/2009 | Nakai et al. |

FOREIGN PATENT DOCUMENTS

| | | |
|---|---|---|
| JP | 2004012299 A | 1/2004 |
| JP | 2004020494 A | 1/2004 |
| JP | 2004052928 A | 2/2004 |
| JP | 2005-90575 | 4/2005 |

* cited by examiner

FORWARD

REVERSE

US 8,072,168 B2

POSITION DETECTING APPARATUS HAVING ELECTRIC MOTOR AND METHOD FOR DETECTING POSITION

CROSS REFERENCE TO RELATED APPLICATIONS

This application is a division of application Ser. No. 11/318,529 filed Dec. 28, 2005 (now issued as U.S. Pat. No. 7,446,499), which is a division of application Ser. No. 12/232,500, filed Sep. 18, 2008 (now issued as U.S. Pat. No. 7,635,961), which is in turn based on Japanese Patent Application No. 2004-381753 filed on Dec. 28, 2004, the disclosures of which are incorporated herein by reference.

FIELD OF THE INVENTION

The present invention relates to a position detecting apparatus having an electric motor. In particular, the present invention relates to an apparatus for detecting a reference position of a driven object to define an initial position of the driven object in a starting condition of a vehicle. Specifically, the present invention relates to a technology for defining an initial position of one of a rotor and a shift range switching device using an electric motor in an automatic transmission apparatus for a vehicle, for example. In addition, the present invention relates to a method for detecting a position in an object.

BACKGROUND OF THE INVENTION

According to JP-A-2004-12299 (U.S. Pat. No. 6,911,798 B2), an electric motor operates a shift range switching device for an automatic transmission of a vehicle. In this structure, an electric motor is supplied with electricity to perform a tapping control, when a reference position of a rotor or a shift position is unknown in a starting condition of the vehicle. During the tapping control, the rotor is rotated to a limit position on one side in a movable range of the shift range switching device, for example, so that the rotor is rotated until the rotor reaches at the limit position. The limit position is on the side of the parking position, for example. The position, in which the rotor stops, is defined as one of the reference position in the rotation control of the rotor and a reference position of the shift switching control, during the tapping control.

When the tapping control is performed, the following problems may arise. First, when a movable member collides against a fixed member in the tapping control, a mechanical load is applied to both the movable member and the fixed member. Alternatively, when the movable member is stopped while an electric motor is supplied with electricity, load torque is applied to components in both a transmission system for rotating the movable member and a hooking portion, in which the movable member hooks to the fixed member, due to torque applied by the electric motor. Accordingly, as the number of the tapping control increases, mechanical damage may occur in the components of the transmission system and in the hooking portion, in which the movable member hooks to the fixed member. As a result, the components of the transmission system and the hooking portion may be gradually deformed and broken.

Second, output voltage and a capacity of a power source such as a battery may vary in dependence upon the environment such as atmospheric temperature and an operating condition. In this case, electricity supplied to the electric motor from the power source may vary, and output torque of the electric motor may change. Specifically, the output torque of the motor may increase in dependence upon the environment and the operating condition. In this situation, mechanical load may increase when the movable member collides against the fixed member. Alternatively, large mechanical torque may be applied to the components in the transmission system and the hooking portion, because of supplying electricity to the electric motor even when the movable member stops. Accordingly, as the number of the tapping control increases, the number of applying large load torque increases, and as a result, mechanical damage may occur in the components of the transmission system and the hooking portion.

In addition, the components are not necessarily perfect rigid bodies. That is, the components are macroscopically spring elements, and the components may cause deflection when being applied with force. When output torque of the motor varies, an amount of deflection arising in the components varies. As a result, the reference position, which is learned during the tapping control of the movable member, cannot be stable. Thus, a positioning control of the movable member cannot be steadily performed.

Third, as the rotation speed of the electric motor increases, the output torque of the electric motor decreases. By contrast, as the rotation speed of the electric motor decreases, the output torque of the electric motor increases. Accordingly, when the movable member stops while the electric motor is supplied with electricity, the electric motor generates the maximum torque. Consequently, large mechanical torque is applied to the components of the transmission system and the hooking portion between the movable member and the fixed member. Accordingly, as the number of the tapping control increases, the number of applying large load torque increases. Consequently, mechanical damage may occur in the components of the transmission system and the hooking portion.

SUMMARY OF THE INVENTION

In view of the foregoing and other problems, it is an object of the present invention to produce a position detecting apparatus, the apparatus being capable of reducing damage occurring in a detecting operation of the position. It is another object of the present invention to produce a method for detecting the position in an object.

According to one aspect of the present invention, a reference position detecting apparatus includes an electric motor, a driven object, a tapping control unit, and a reference position recognizing unit. The electric motor includes a coil device and a rotor. The rotor rotates when the coil device is supplied with electricity. The driven object is driven by the rotating rotor. The tapping control unit performs a tapping control, in which the rotor rotates to a limit position on one side in a movable range of the driven object. The reference position recognizing unit defines a point, at which rotation of the rotor stops, as a reference position of one of the rotor and the driven object during the tapping control.

The coil device may have a first coil group and a second coil group. The first coil group includes a plurality of first coils, which electrically connect with each other. The second coil group includes a plurality of second coils, which electrically connect with each other. The first coil group including the plurality of first coils is electrically separated from the second coil group including the plurality of second coils. The tapping control unit may control electricity supplied to either one of the first coil group and the second coil group to rotate the rotor during the tapping control.

The tapping control unit may perform a duty control with respect to electricity supplied to the either one of the first coil group and the second coil group such that an amount of electricity flowing through the either one of the first coil group and the second coil group becomes substantially constant during the tapping control.

The tapping control unit may perform a duty control with respect to electricity supplied to the either one of the first coil group and the second coil group in accordance with speed of the rotor such that an output torque of the rotor becomes substantially constant during the tapping control.

A method for detecting a position in an object, the method includes the following step. Electricity supplied to either one of a plurality of first coils and a plurality of second coils in an electric motor is controlled to rotate a rotor to a limit position in a movable range of the object.

A duty control may be performed with respect to electricity supplied to the either one of the plurality of first coils and the plurality of second coils such that an amount of electricity flowing through the either one of the plurality of first coils and the plurality of second coils becomes substantially constant.

A duty control may be performed with respect to electricity supplied to the either one of the plurality of first coils and the plurality of second coils in accordance with speed of the rotor such that output torque of the rotor becomes substantially constant.

In the above structure, a load caused by collision of components can be reduced. Therefore, mechanical damage in the components can be reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 2:
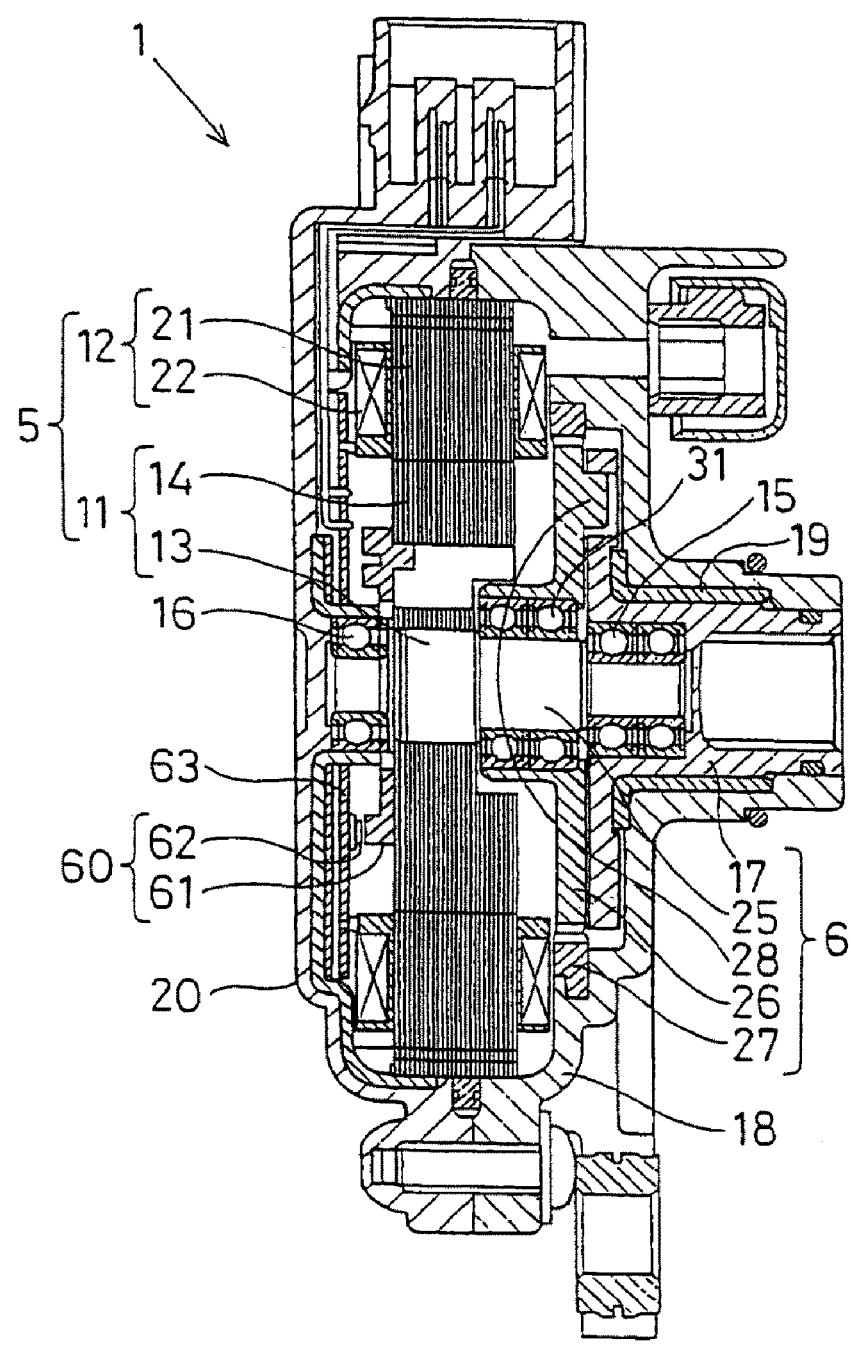
FIG. 2 is a partially cross sectional side view showing a shift range switching device according to the first embodiment.
Figure 3:
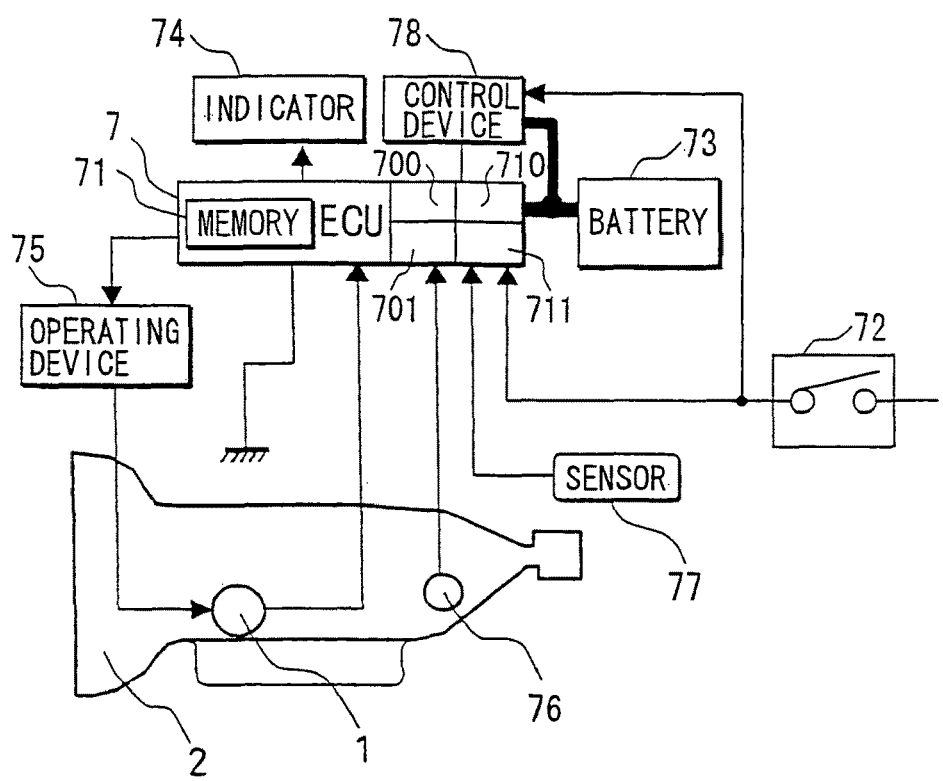
FIG. 3 is a schematic diagram showing a system of the shift range switching device according to the first embodiment.
Figure 4:
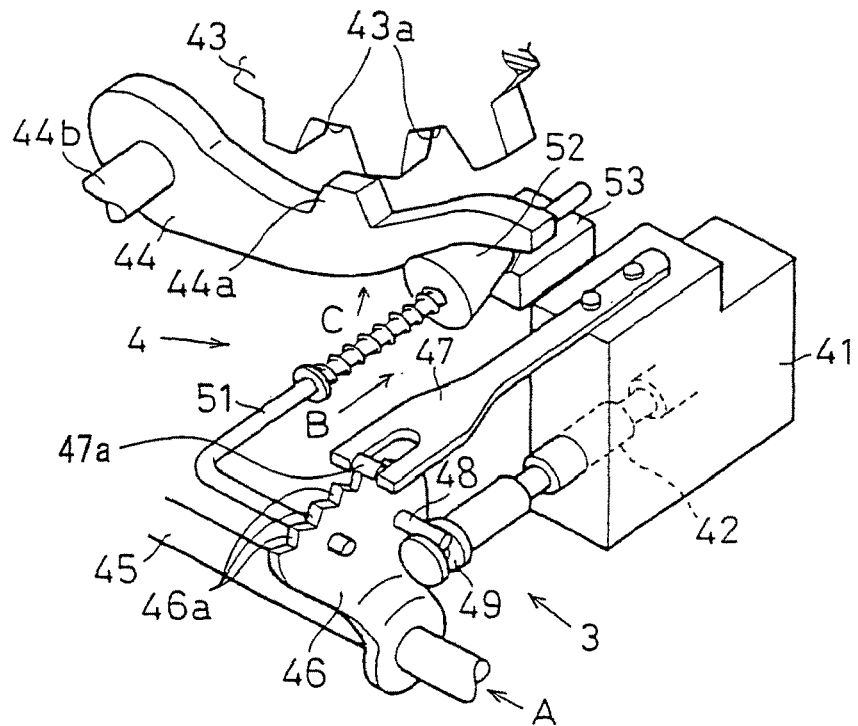
FIG. 4 is a perspective view showing the shift range switching device according to the first embodiment.

As shown in FIGS. 1A to 3, a shift range switching apparatus includes a rotative actuator 1 (FIG. 2) that switches a shift range switching device 3, which includes a parking switching device 4 (FIG. 4). The shift range switching device 3 is an example of a driven object. The shift range switching device 3 is provided to an automatic transmission 2 of a vehicle. The rotative actuator 1 is a servo device that operates the shift range switching device 3. The rotative actuator 1 includes a synchronous electric motor 5 and a reduction gear (reduction unit) 6. The reduction gears 6 reduce rotation speed of the electric motor 5. The electric motor 5 is controlled using an ECU (electronic control unit) 7. The ECU 7 serves as a motor control unit.

Specifically, the ECU 7 controls the rotative direction of the electric motor 5, the rotation speed (number of rotation) of the electric motor 5, and rotation angle of the electric motor 5 in the shift range switching apparatus, thereby operating the shift range switching device 3 via the reduction gears 6.

In the following description, the right side in FIG. 2 is defined as a front side, and the left side in FIG. 2 is defined as a rear side.

Figure 5:
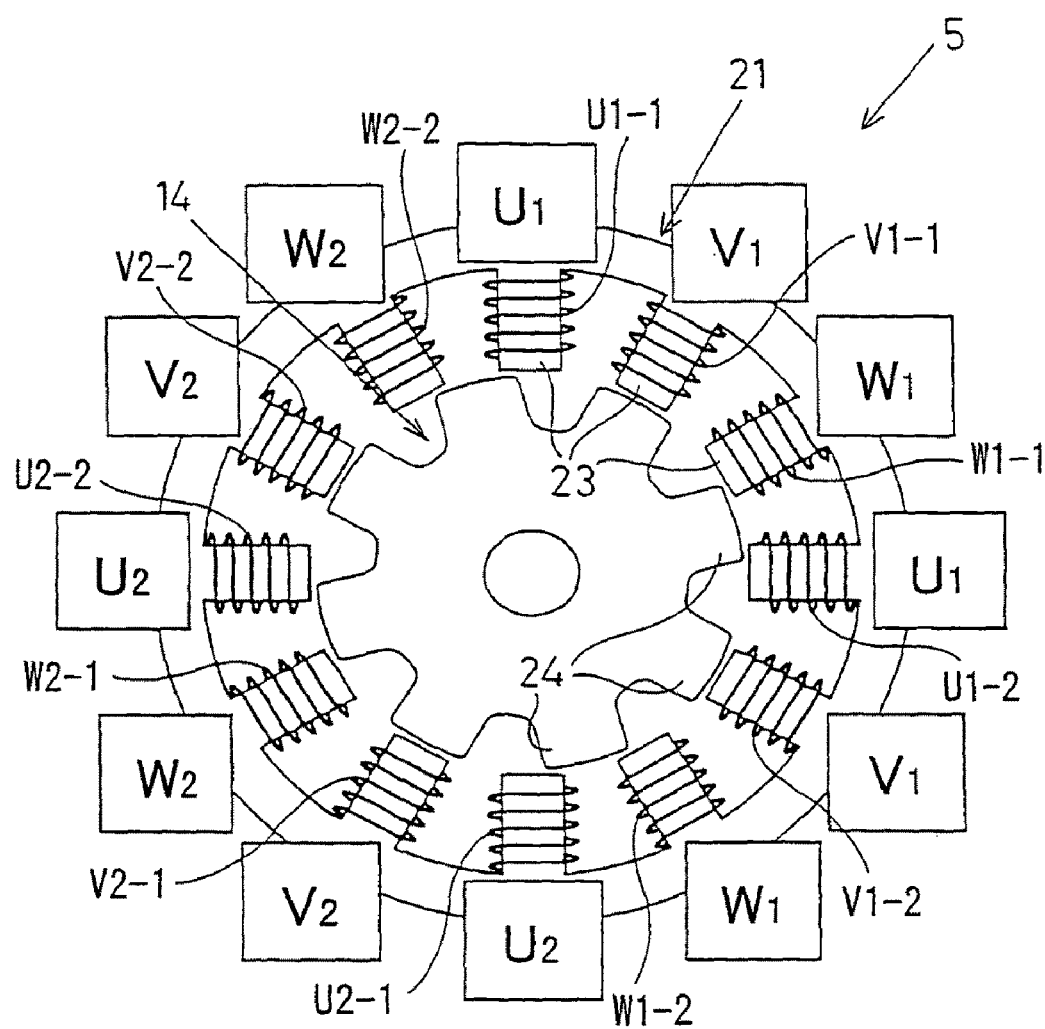
FIG. 5 is a schematic view showing an electric motor according to the first embodiment.

Next, the electric motor 5 is described in reference to FIGS. 2, 5. The electric motor 5 is a blushless switched reluctance motor (SR motor), in which a permanent magnet is not used. The electric motor 5 includes a rotor 11 and a stator 12. The rotor 11 is rotatable. The stator 12 is arranged coaxially with respect to the rotation center of the rotor 11.

The rotor 11 is constructed of a rotor shaft 13 and a rotor core 14. The rotor shaft 13 is rotatably supported using a front ball bearing 15 and a rear ball bearing 16. The front ball bearing 15 is provided to a front end of the rotor shaft 13, and the rear ball bearing 16 is provided to a rear end of the rotor shaft 13.

The front ball bearing 15 engages with the inner circumferential periphery of an output shaft 17 of the reduction gears 6. The output shaft 17 of the reduction gears 6 is rotatably supported via a metal bearing 19, which is arranged in the inner circumferential periphery of the front housing 18. That is, the front end of the rotor shaft 13 is rotatably supported via the metal bearing 19, the output shaft 17, and the front ball bearing 15, which are provided in a front housing 18.

The metal bearing 19 supports the front end of the rotor shaft 13 in a supporting range, which axially overlaps a supporting range of the front ball bearing 15. In this structure, the rotor shaft 13 can be restricted from being inclined due to reactive force of the reduction gears 6. Specifically, the reactive force is caused by a load applied to the gearing portion between a sun gear 26 and a ring gear 27. The rear ball bearing 16 is press-inserted into the outer circumferential periphery of the rear end of the rotor shaft 13, thereby being supported by a rear housing 20. The rear housing 20 serves as a stator housing.

Figure 6:
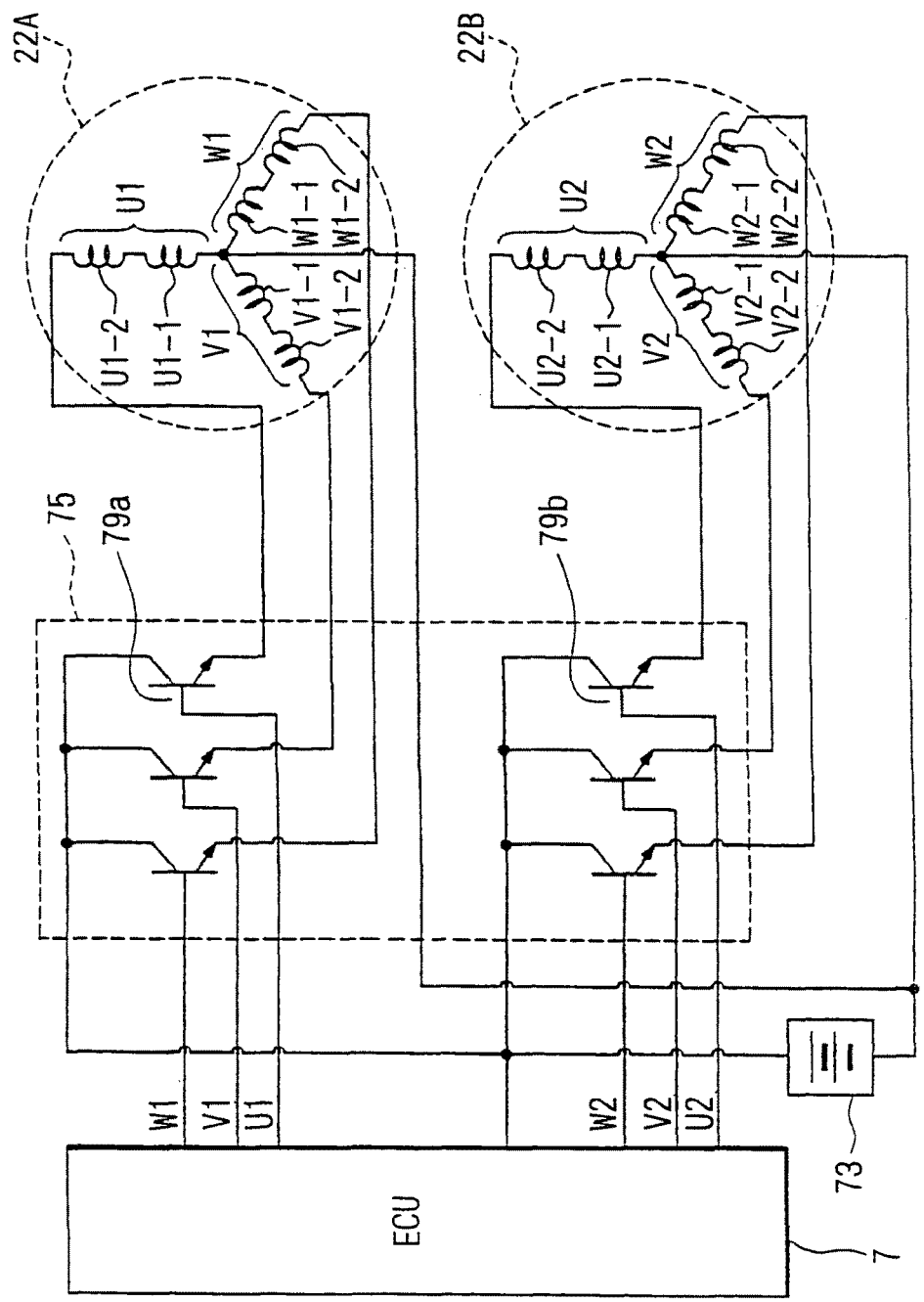
FIG. 6 is a schematic diagram showing an electric connection of the electric motor, according to the first embodiment.

The stator 12 is constructed of a fixed stator core 21 and magnetizing coil (coil device) 22. The coil device 22 generates magnetic force by being energized. The coil device 22 is multiphase. Specifically, as shown in FIGS. 5, 6, the coil device 22 has a first coil group 22A and a second coil group 22B. The first coil group 22A includes coils U1, V1, and W1. The second coil group 22B includes coils U2, V2, and W2. The coils U1, V1, and W1 of the first coil group 22A and the coils U2, V2, and W2 of the second coil group 22B construct a multiphase structure of the coil device 22.

The stator core 21 is constructed of stacked thin plates. The stator core 21 is fixed to the rear housing 20 (FIG. 2). As referred to FIG. 5, the stator core 21 has stator teeth 23 (introverted salient poles) that protrude inwardly toward the rotor core 14. The stator teeth 23 are arranged at substantially regular circumferential intervals, which are substantially 30°. Each of the coils U1, V1, and W1 of the first coil group 22A is wound around each of the stator teeth 23 to generate magnetic force in each of the stator teeth 23. Each of the coils U2, V2, and W2 of the second coil group 22B is wound around each of the stator teeth 23 to generate magnetic force in each of the stator teeth 23. The coils U1, U2 are in U-phase, the coils V1, V2 are in V-phase, and the coils W1, W2 are in W-phase.

Next, the coil device 22 is described in reference to FIGS. 5, 6. As shown in FIG. 6, the coils U1, V1, and W1 of the first coil group 22A are wound separately from the coils U2, V2, and W2 of the second coil group 22B in the coil device 22. The coils U1, V1, and W1 of the first coil group 22A and the coils U2, V2, and W2 of the second coil group 22B are connected respectively in a manner of the star connection. The rotor 11 can be rotated by supplying electricity only to the coils U1, V1, and W1 of the first coil group 22A. Alternatively, the rotor 11 can be rotated by supplying electricity only to the coils U2, V2, and W2 of the second coil group 22B.

The coils U1, V1, and W1 of the first coil group 22A and the coils U2, V2, and W2 of the second coil group 22B are divided into multiple windings. In this embodiment, the number of the windings is two. Specifically, the coils U1, V1, and W1 of the first coil group 22A are constructed of a first group of the coils U1-1, V1-1, and W1-1 and a second group of the coils U1-2, V1-2, and W1-2. The first group of the coils U1-1, V1-1, and W1-1 are respectively provided to the stator teeth 23, which are in series along the rotative direction. The second group of the coils U1-2, V1-2, and W1-2 are respectively provided to the stator teeth 23, which are in series along the rotative direction. The second group of the coils U1-2, V1-2, and W1-2 continues from the first group of the coils U1-1, V1-1, and W1-1 along the rotative direction.

The coils U2, V2, and W2 of the second coil group 22B are constructed of a first group of the coils U2-1, V2-1, and W2-1 and a second group of the coils U2-2, V2-2, and W2-2. The first group of the coils U2-1, V2-1, and W2-1 are respectively provided to the stator teeth 23, which are in series along the rotative direction. The second group of the coils U2-2, V2-2, and W2-2 are respectively provided to the stator teeth 23, which are in series along the rotative direction. The second group of the coils U2-2, V2-2, and W2-2 continues from the first group of the coils U2-1, V2-1, and W2-1 along the rotative direction.

When the coil device 22 is energized, the groups of the coils respectively generate magnetism indicating magnetic poles, which are opposite to each other in the rotative direction. Specifically, for example, when the coil device 22 is energized, and when the inner ends of the first group of the coils U1-1, V1-1, and W1-1 are magnetized in the north pole, the adjacent inner ends of the second group of the coils U1-2, V1-2, and W1-2 are magnetized in the south pole, the adjacent inner ends of the first group of the coils U2-1, V2-1, and W2-1 are magnetized in the north pole, and the adjacent inner ends of the second group of the coils U2-2, V2-2, and W2-2 are magnetized in the south pole.

In this situation, for example, when two coils U1-1, U1-2 are energized, the radially inner portion of the stator tooth 23, around which the coil U1-1 is wound, is magnetized in the north pole, and the radially inner portion of the stator tooth 23, around which the coil U1-2 is wound, is magnetized in the south pole. The stator tooth 23, around which the coil U1-1 is wound, is disposed substantially 90° distant from the stator tooth 23, around which the coil U1-2 is wound, with respect to the rotative direction of the stator core 21.

Similarly, in the coils V1, W1, U2, V2, W2, one of two stator teeth 23, which is distant from the other of the two stator teeth 23 for substantially 90° in the rotative direction, generates magnetism of one of the south pole and the north pole. In this case, the other of the two stator teeth 23 generates the other of the south pole and the north pole.

As referred to FIG. 2, the rotor core 14 is constructed by stacking thin plates. The rotor core 14 is press-inserted into and fixed to the rotor shaft 13. The rotor core 14 has rotor teeth 24 (extroverted salient poles, FIG. 5) that outwardly protrude to the stator core 21 on the radially outer side thereof. The rotor teeth 24 are arranged at substantially regular circumferential intervals, which are substantially 45°.

The energizing position and the energizing direction of the coil device 22 of the U-phase, V-phase, and W-phase are sequentially switched, so that the stator teeth 23, which magnetically attract the rotor teeth 24, are switched. Thus, the rotor 11 is rotated in both the normal direction and the reverse direction.

Figure 7:
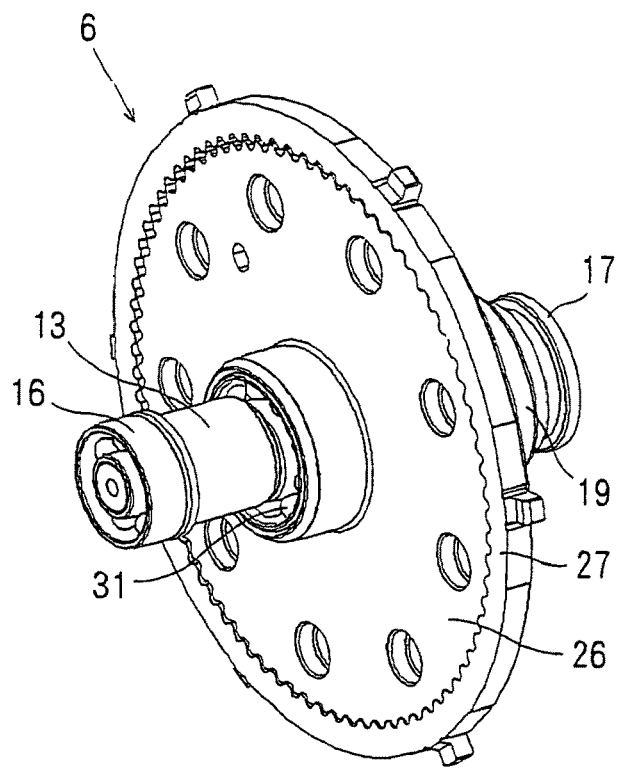
FIG. 7 is a perspective front view showing a reduction gear according to the first embodiment.
Figure 8:
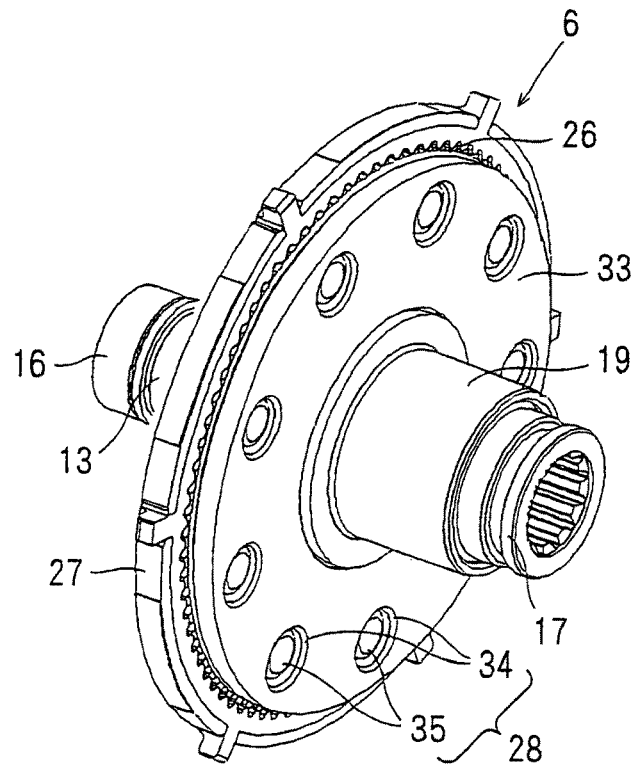
FIG. 8 is a perspective rear view showing the reduction gear according to the first embodiment.
Figure 9:
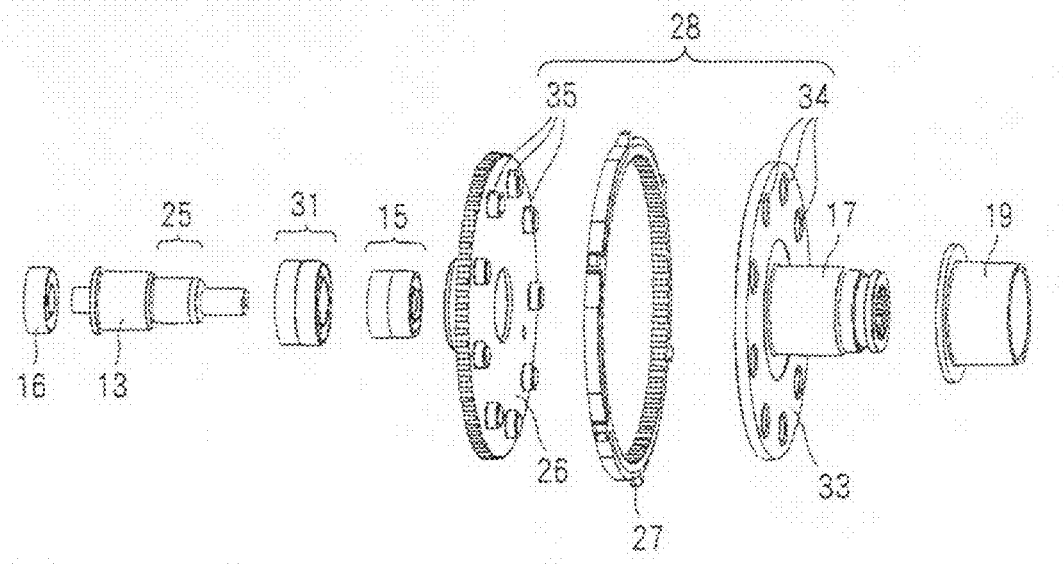
FIG. 9 is an exploded perspective view showing the reduction gear according to the first embodiment.

Next, the reduction gears 6 are described in reference to FIGS. 7 to 9.

The reduction gears 6 are cycloidal gears, for example. The reduction gears 6 are some type of a planetary gear train, which constructs an inscribed planetary gear reduction mechanism. The reduction gears 6 includes a sun gear 26 (inner gear, external gear), a ring gear 27 (outer gear, internal gear), and a transmission device 28. The sun gear 26 is capable of rotating eccentrically with respect to the rotor shaft 13 via an eccentric portion 25, which is provided to the rotor shaft 13. The ring gear 27 internally engages with the sun gear 26. The transmission device 28 transmits rotation of the sun gear 26 to the output shaft 17.

The eccentric portion 25 is an axis that rotates eccentrically with respect to the rotation center of the rotor shaft 13, thereby rotating the sun gear 26 along an orbital path. The eccentric portion 25 rotatably supports the sun gear 26 via a sun gear bearing 31, which is provided to the circumferential outer periphery of the eccentric portion 25.

As described above, the sun gear 26 is rotatably supported via the sun gear bearing 31 such that the sun gear 26 is capable of rotating with respect to the eccentric portion 25 of the rotor shaft 13. As the eccentric portion 25 rotates, The sun gear 26 is rotated in a condition, in which the sun gear 26 is pressed onto the ring gear 27. The ring gear 27 is fixed to the front housing 18.

The output shaft 17 rotates integrally with a flange 33. The flange 33 is arranged to the rear end of the output shaft 17. The flange 33 has multiple inner pin holes 34, which are formed coaxially with the flange 33. The sun gear 26 has a front surface, from which multiple inner pins 35 protrude. The inner pins 35 of the sun gear 26 loosely engage with the inner pin holes 34 of the flange 33, so that the transmission device 28 is constructed. Thus, rotation of the sun gear 26 is transmitted to the output shaft 17.

In this structure, the rotor shaft 13 rotates, so that the sun gear 26 eccentrically rotates, and the sun gear 26 reduces rotation speed with respect to the rotation of the rotor shaft 13. The reduced rotation speed of the sun gear 26 is transmitted to the output shaft 17. The output shaft 17 connects with a control rod 45 (FIG. 4) of the shift range switching device 3.

The sun gear 26 may have the multiple inner pin holes 24, and the flange 33 may have the multiple inner pins 35, dissimilarly to the above structure.

Next, the shift range switching device 3 is described in reference to FIGS. 3, 4.

The shift range switching device 3 including the parking switching device 4 is switched using the output shaft 17 of the reduction gears 6. A manual spool valve 42 provided to a hydraulic valve body 41 is slid and displaced to a predetermined position, so that hydraulic passages are switched. The hydraulic passages are connected to a hydraulic clutch (not shown) of the automatic transmission 2. Thus, the engagement condition of the hydraulic clutch is controlled, so that the shift ranges such as P, R, N, and D in the automatic transmission 2 are switched.

The parking switching device 4 is locked and unlocked by engagement and disengagement between a recession 43a of a park gear 43 and a protrusion 44a of the park pole 44. The park gear 43 connects with an output shaft (not shown) of the automatic transmission 2 via a driveshaft (not shown) and a differential gear (not shown). The park gear 43 is restricted in rotation thereof, so that the drive wheel of the vehicle is locked, consequently the vehicle becomes in the parking condition.

The control rod 45 is driven using the reduction gears 6. A detent plate 46, which is in a substantially sector form, is connected to the control rod 45 with a spring pin or the like (not shown). The detent plate 46 has multiple recessions 46a in the radially tip end thereof. The radially tip end of the detent plate 46 is the arc shaped portion in the sector-shaped portion. A detent spring 47 is fixed to the hydraulic valve body 41. The detent spring 47 has a hooking portion 47a in the tip end thereof. The hooking portion 47a hooks to one of the recessions 46a of the detent plate 46, so that the shift range is maintained.

Both ends of the recessions 46a of the detent plate 46 between the P range and the D range have restriction walls. The hooking portion 47a of the detent spring 47 hooks to the restriction walls, so that the restriction walls restrict the electric motor 5 from rotating. Specifically, the detent plate 46 does not have rigid walls for restricting electric motor 5 from rotating. The restriction walls are imaginary wall. The hooking portion 47a of the detent spring 47 hooks to the recession 46a of the detent plate 46, so that the restriction walls restrict the electric motor 5 from further rotating.

The detent plate 46 has a pin 48 that operates the manual spool valve 42. The pin 48 engages with a groove 49 that is formed in the end of the manual spool valve 42. When the detent plate 46 is rotated via the control rod 45, the pin 48 is moved along an arch-shaped path, so that the manual spool valve 42, which engages with the pin 48, linearly moves in the hydraulic valve body 41.

When the control rod 45 is rotated in the clockwise direction with respect to the direction when being viewed from the arrow A in FIG. 4, the pin 48 pushes the manual spool valve 42 into the hydraulic valve body 41 via the detent plate 46. Thus, the hydraulic passages in the hydraulic valve body 41 are switched in the order of D, N, R, and P ranges, so that the shift ranges of the automatic transmission 2 are switched in the order of D, N, R, and P ranges. When the control rod 45 is rotated in the reverse direction, the pin 48 pulls the manual spool valve 42 from the hydraulic valve body 41, so that the hydraulic passages in the hydraulic valve body 41 are switched in the order of P, R, N, and D ranges. Thus, the shift ranges of the automatic transmission 2 are switched in the order of P, R, N, and D ranges.

The detent plate 46 is provided with a park rod 51 for operating the park pole 44. The park rod 51 has a tip end, to which a conical portion 52 is provided.

The conical portion 52 is interposed between a protrusion 53 of the housing of the automatic transmission 2 and the park pole 44. When the control rod 45 is rotated from the R range to the P range in the clockwise direction with respect to the direction when being viewed from the arrow A in FIG. 4, the park rod 51 is displaced via the detent plate 46 in the direction shown by arrow B in FIG. 4. Thus, the conical portion 52 raises the park pole 44, so that the park pole 44 rotates around a shaft 44b in the direction shown by the arrow C in FIG. 4. Thus, the protrusion 44a of the park pole 44 engages with the recession 43a of the park gear 43. In this condition, the parking switching device 4 becomes in a lock condition.

When the control rod 45 is rotated from the P range to the R range in the counterclockwise direction, the park rod 51 is pulled in the direction opposite to the arrow B in FIG. 4, so that the conical portion 52 terminates raising the park pole 44. The park pole 44 is regularly biased using a coil spring (not shown) in the direction opposite to the arrow C in FIG. 4, so that the protrusion 44a of the park pole 44 is detached from the recession 43a of the park gear 43. In this condition, the park gear 43 becomes free from the park pole 44, so that the parking switching device 4 becomes in the unlock condition.

Next, an encoder 60 is described in reference to FIGS. 2, 10A to 14B. The rotative actuator 1 has the housing, which is constructed of the front housing 18 and the rear housing 20. The housing of the rotative actuator 1 accommodates the encoder (rotation angle detecting device) 60 that detects the rotation angle of the rotor 11. The electric motor 5 can be rotated at high speed while maintaining synchronism, by detecting the rotation angle of the rotor 11 using the encoder 60.

Figure 13:
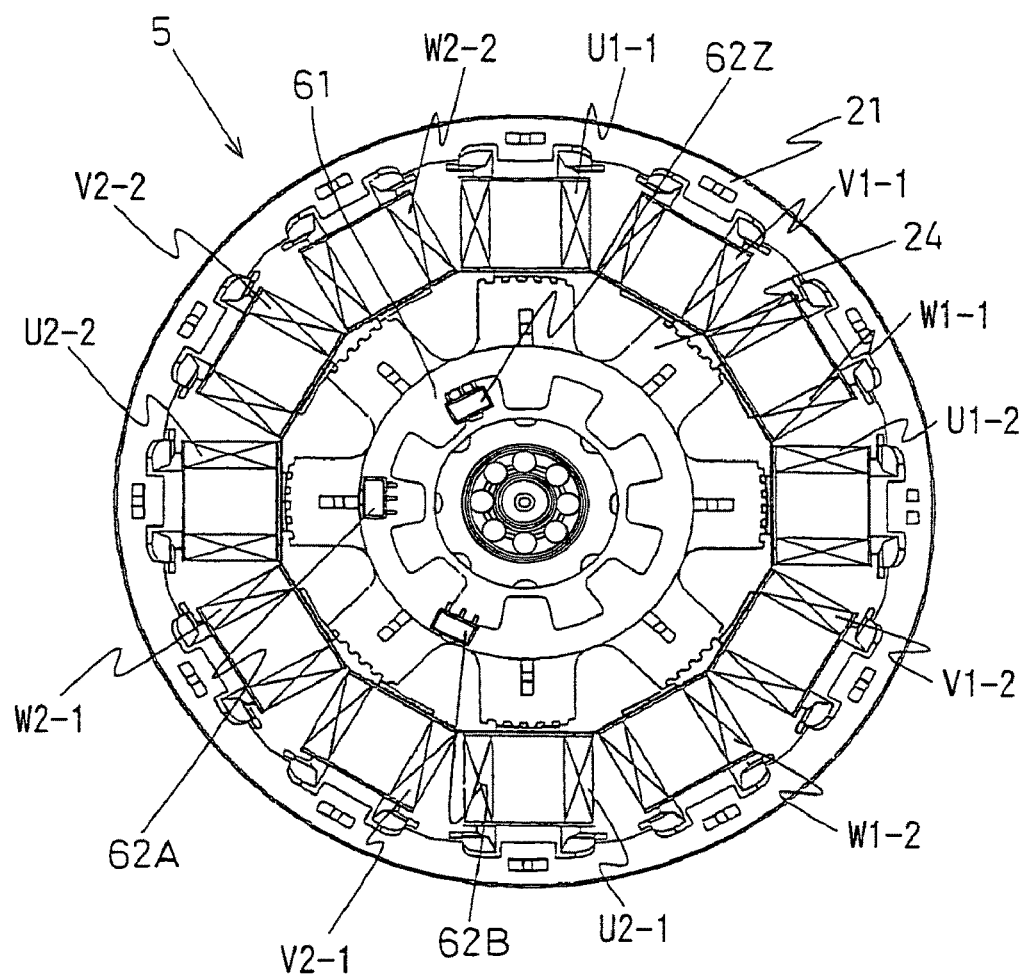
FIG. 13 is a schematic front view showing hall ICs provided to the electric motor, according to the first embodiment.

The encoder 60 is an incremental encoder, which includes a magnet 61 and a hall IC 62. The magnet 61 rotates integrally with the rotor 11. The hall IC 62 is arranged in the rear housing 20 for detecting magnetism. As shown in FIG. 13, the hall IC 62 includes a first rotation angular hall IC 62A, a second rotation angular hall IC 62B, and an index hall IC 62Z. The hall IC 62 is supported by a substrate 63 (FIG. 2) mounted in the rear housing 20.

As shown in FIGS. 10A to 12, the magnet 61 is in a substantially annular disc shape, and is arranged coaxially with respect to the rotor shaft 13. The magnet 61 connects with the axial end surface in the rear side of the rotor core 14. When the rotor core 14 exerts large magnetic influence to the magnet 61, the magnet 61 may be connected with the rotor core 14 via a non-magnetic diaphragm (not shown) to reduce the influence of the magnetism. When the rotor core 14 exerts small magnetic influence to the magnet 61, the magnet 61 may be directly connected with the rotor core 14. In this structure, the number of components can be reduced, so that manufacturing cost can be reduced.

Figure 12:
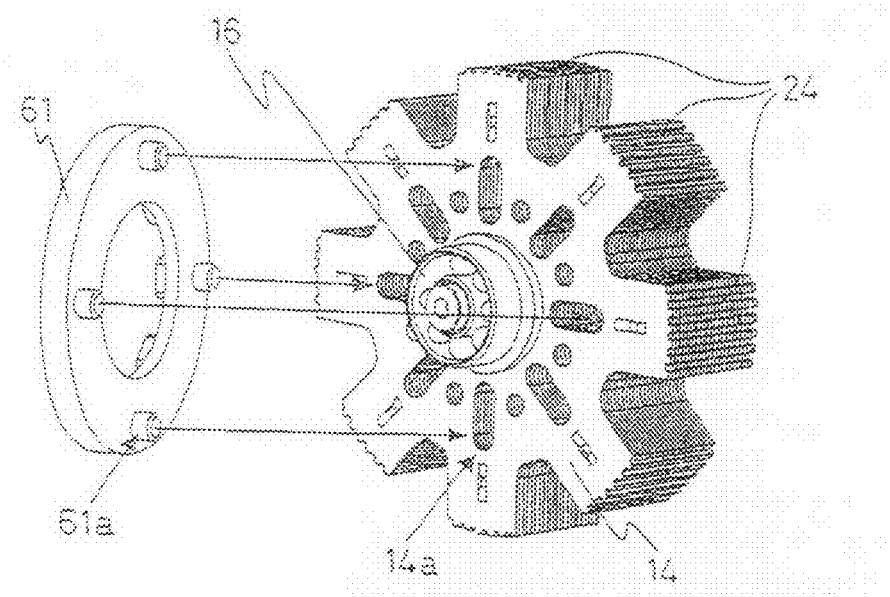
FIG. 12 is an exploded perspective view showing the rotor and the magnet, according to the first embodiment.

As shown in FIG. 12, the rear surface of the rotor core 14 has multiple holes 14a for alignment of the magnet 61. The magnet 61 has a connecting surface, on which multiple protrusions 61a are provided. The protrusions 61a of the magnet 61 are inserted into the corresponding holes 14a of the rotor core 14, so that the magnet 61 is assembled to the rotor core 14 such that the magnet 61 is substantially coaxial with respect to the rotation center of the rotor core 14.

Figure 11:
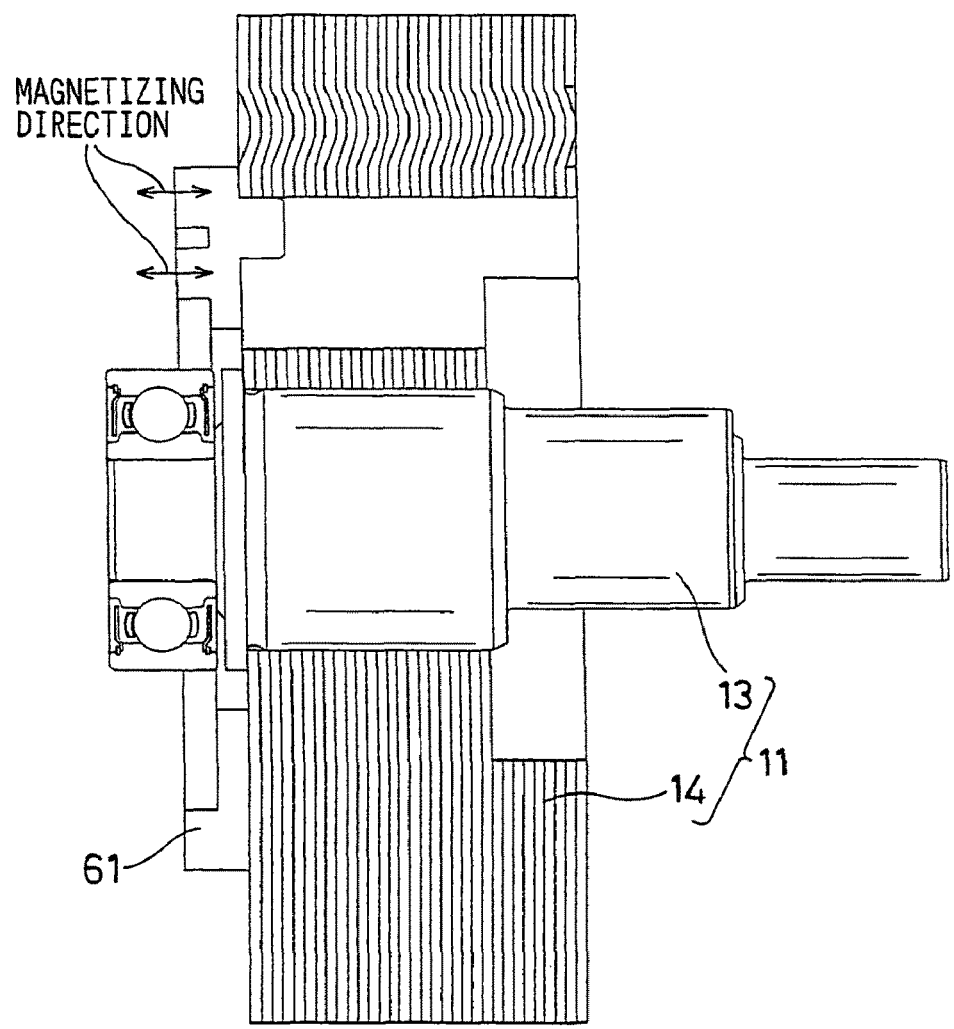
FIG. 11 is a partially cross sectional side view showing a rotor with the magnet, according to the first embodiment.

As shown in FIG. 11, the magnet 61 has the rear end surface, which opposes to the hall IC 62 (FIG. 2). The rear end surface of the magnet 61 is magnetized for detecting the rotation angle and an index for a phase to be energized, thereby generating magnetism in the axial direction of the magnet 61.

Figure 10A:
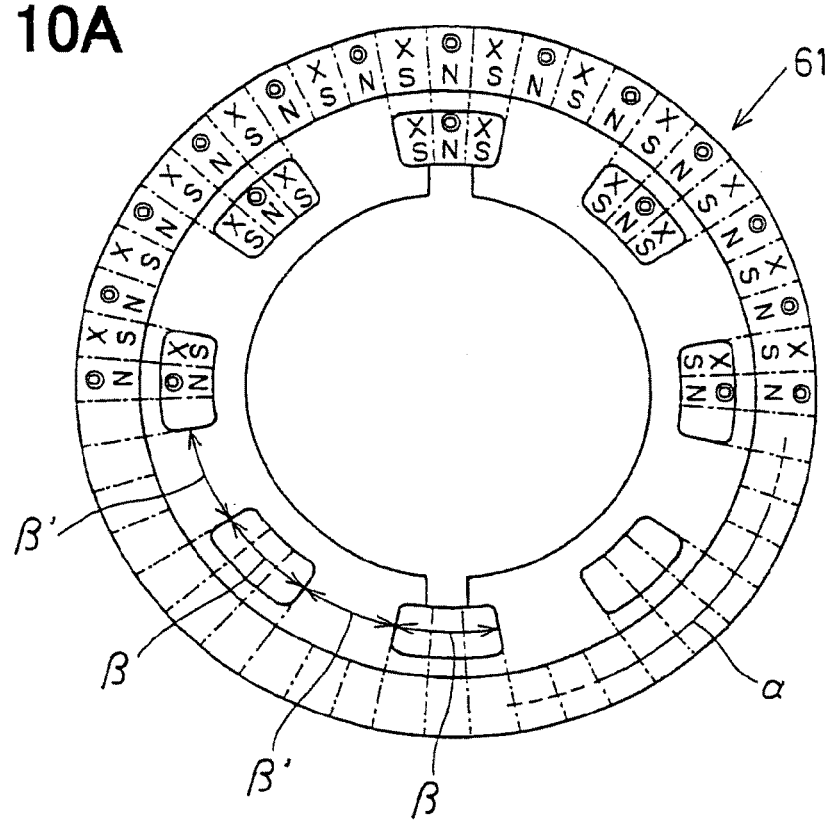
FIG. 10A is a front view showing a magnetized structure of a magnet.
Figure 10B:
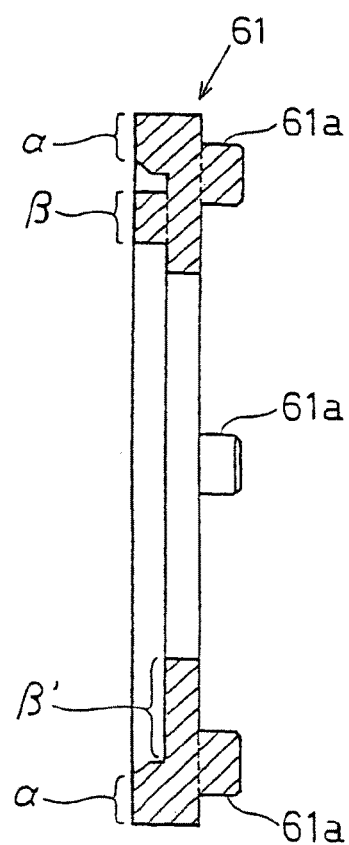
FIG. 10B is a cross sectional side view showing the magnet, according to the first embodiment.

Next, magnetized structure of the rear surface of the magnet 61 is described in reference to FIGS. 10A, 10B.

The magnet 61 has a rotation angular magnetized portion α on the rear surface thereof on the outer peripheral side thereof. The rotation angular magnetized portion α has multipolar magnetized portions along the rotative direction thereof for generating rotative angular signals and for terminating the rotative angular signals. Magnetized index portions β and non-magnetized index portions β' are provided to be adjacent to the inner periphery of the rotation angular magnetized portion α along the rotative direction of the magnet 61. The magnetized index portions β generate the index signals and terminate the index signals. The non-magnetized index portions β' do not perform the operation of the generating the index signals.

The rotation angular magnetized portion α has multipolar magnetized portions along the rotative direction thereof for generating rotative angular signals, which includes A-phase signals and B-phase signals. In the structure of the rotation angular magnetized portion α shown in FIG. 10A, the portion (north pole portion), which generates the magnetism (north pole magnetism) of the north pole, and the portion (south pole portion), which generates the magnetism (south pole magnetism) of the south pole, are alternatively arranged at intervals of substantially 7.5°, for example. Specifically, the rotation angular magnetized portion α has 48 poles of A-phase sensing portions and B-phase sensing portions, for example.

The magnetized index portions β respectively generate index signals (Z-phase signal) at intervals of 45°, for example. The coil device 22 of the U-phase, V-phase, and W-phase make around at the intervals of 45°, for example. Each of the magnetized index portions β includes the portion (north pole portion) magnetized to generate the north pole magnetism for a range of 7.5°. Portions (south pole portion) magnetized to generate the south pole magnetism are arranged on both sides of the north pole portion along the rotative direction, in each of the magnetized index portions β.

Each of the non-magnetized index portions β' is arranged between two magnetized index portions β, which are adjacent to each other along the rotative direction. Each non-magnetized index portion β' is not magnetized, so that the non-magnetized index portion β' does not generate the index signal.

The first and second rotation angular hall ICs 62A, 62B are supported by the substrate 63 in a condition, in which the first and second rotation angular hall ICs 62A, 62B respectively oppose to the rotation angular magnetized portion α in the axial direction. The index hall IC 62Z is supported by the substrate 63 in a condition, in which the index hall IC 62Z opposes to the magnetized index portions β and non-magnetized index portions β' in the axial direction.

The first and second rotation angular hall ICs 62A, 62B are distant from each other relatively for substantially 3.75°, for example (for substantially 90° in an electric angle, for example, as shown in FIG. 14).

Therefore, the A-phase signal and the B-phase signal are distant from each other relatively for substantially 3.75°, for example (for substantially 90° in an electric angle, for example).

A hall element and an ON-OFF signal generating IC are integrated to construct the first and second rotation angular hall ICs 62A, 62B and the index hall IC 62Z. The hall element generates a signal in accordance with an amount of magnetic flux passing through the hall element.

When magnetic flux on the side of the north pole applied to the hall element becomes greater than a threshold, the ON-OFF signal generating IC turns the rotation angular signals ON. That is, the ON-OFF signal generating IC generates the A-phase signal, B-phase signal, and Z-phase signal. When the magnetic flux, which is on the side of the south pole and is applied to the hall element, becomes greater than a threshold, the ON-OFF signal generating IC, turns the rotation angular signals OFF. That is, the ON-OFF signal generating IC terminates generating the A-phase signal, B-phase signal, and Z-phase signal.

In this embodiment, the hall ICs 62A, 62B, and 62z, in which the hall elements are integrated with ON-OFF signal generating circuits, are described as an example. However, the hall element may be provided individually from the ON-OFF signal generating circuit. Specifically, the ON-OFF signal generating circuit may be assembled on the substrate 63 separately from the hall element. The ON-OFF signal generating circuit may be assembled into the ECU 7.

Figure 14A:
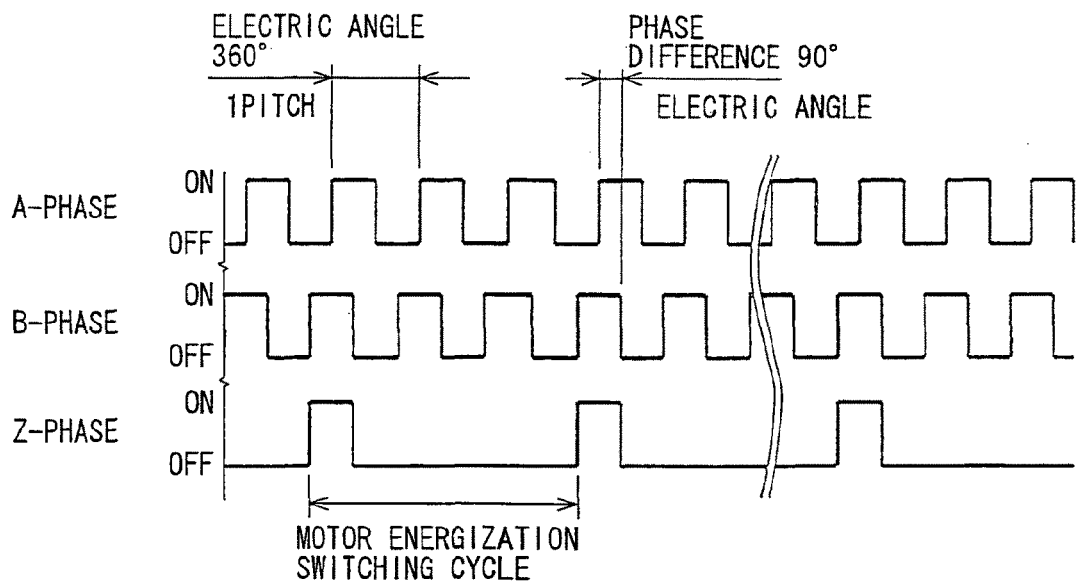
FIGS. 14A and 14B are waveform charts showing output signals of A-phase, B-phase, and Z-phase of the electric motor when the rotor rotates, according to the first embodiment.
Figure 14B:
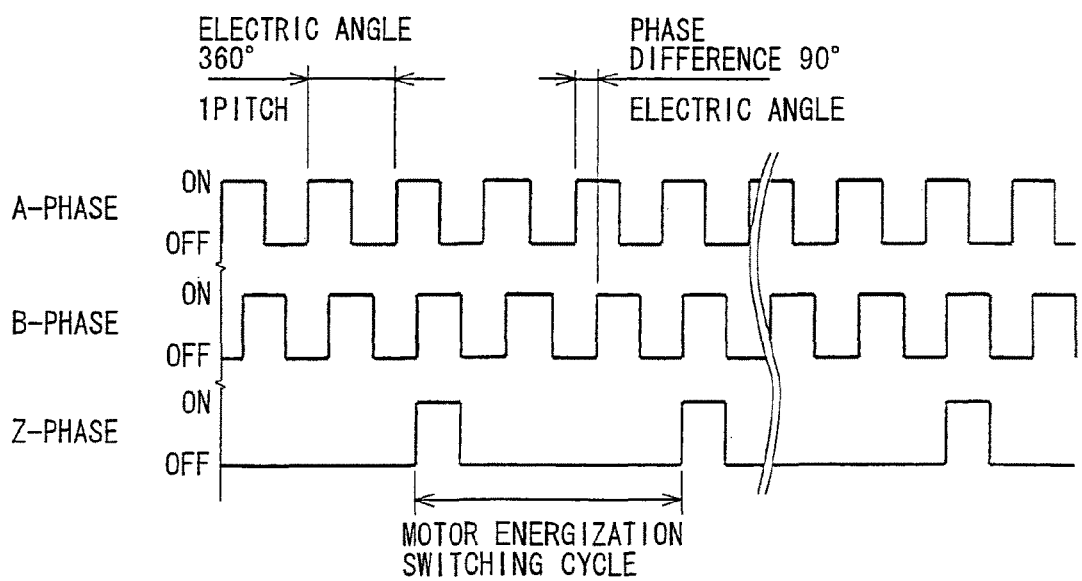

Next, output waveforms of the A-phase signal, B-phase signal, and Z-phase signal generated using the encoder 60 are described in reference to FIGS. 14A, 14B.

The A-phase signal has a phase difference with respect to the B-phase signal relatively for substantially 3.75° (for substantially 90° in an electric angle), for example. In this embodiment, the A-phase signal and the B-shape signal are output respectively for one period at every rotation of substantially 15° of the rotor 11, for example.

The Z-phase signal is the index signal that is output once at every rotation of substantially 45° of the rotor 11, for example. The index signal is used for switching energization of the motor. The index signal is an ON signal in this embodiment, for example. The phase of energization of the electric motor 5 and a physical relationship of the A-phase with respect to the B-phase can be defined by this Z-phase signal.

The substrate 63 supports the first and second rotation angular hall ICs 62A, 62B, which axially oppose to the rotation angular magnetized portion α. The substrate 63 supports the index hall IC 62Z, which axially oppose to both the magnetized index portions β and non-magnetized index portions β'. The substrate 63 is accommodated in the rear housing 20. The substrate 63 is mounted to the lateral surface of the coil device 22 on the rear side.

In the above structure, the encoder 60 is mounted in the rotative actuator 1, so that the rotative actuator 1 can be downsized. Furthermore, the magnet 61 and the hall IC 62 are arranged on the rear side of the rotor core 14, so that the rotative actuator 1 including the encoder 60 can be restricted from being jumboized in the radial direction of the rotative actuator 1. Thus, mountability of the rotative actuator 1 can be enhanced.

Next, the ECU 7 is described in reference to FIG. 3.

The ECU 7 controls electricity supplied to the electric motor 5. The ECU 7 is a microcomputer including a CPU, a storage medium (memory) 71, an input circuit, an output circuit, an electric power source, and the like. The CPU executes control processings and arithmetic processings. The storage medium 71 is such as a ROM, a stand-by RAM, an EEPROM, and a RAM, for storing programs and data.

As shown in FIG. 3, the ECU 7 is electrically connected with devices such as a start switch (ignition switch, accessory switch) 72, an in-vehicle battery 73, an indicating device (indicator) 74, a coil operating device (driver circuit) 75, a vehicular speed sensor 76, and a sensor 77. The indicating device 74 indicates information such as a shift range and a condition of the rotative actuator 1. The indicating device 74 may be a visual display device in a normal operation, a warning light, and a warning beep device, for example. The coil operating device 75 is used for driving the electric motor 5. The sensor 77 includes a shift range detecting sensor, which detects the shift range set by the driver, a sensor for detecting the position of a brake switch, and sensors for detecting other vehicular conditions. A control device 78 controls vehicular electric doors such as an electric slide door and an electric trunk opener, for example.

The coil operating device 75 is provided individually from the ECU 7 in the structure shown in FIG. 3. However, the coil operating device 75 may be accommodated in a casing of the ECU 7.

Next, the coil operating device 75 is described in reference to FIG. 6.

The electric motor 5 includes the first coil group 22A having the coils U1, V1, and W1 and the second coil group 22B having the coils U2, V2, and W2. The first coil group 22A and the second coil group 22B are electrically separated from each other. The coils U1, V1, and W1 of the first coil group 22A and the coils U2, V2, and W2 of the second coil group 22B are respectively connected in a manner of the star connection.

The coil operating device 75 includes a first switching element 79a and a second switching element 79b. The first switching element 79a supplies electricity respectively with the coils U1, V1, and W1 of the first coil group 22A. The second switching element 79b supplies electricity respectively with the coils U2, V2, and W2 of the second coil group 22B. The ECU 7 turns the first and second switching elements 79a, 79b ON and OFF, so that the condition of energizing the coils U1, V1, W1, U2, V2, and W2 are switched.

Figure 15:
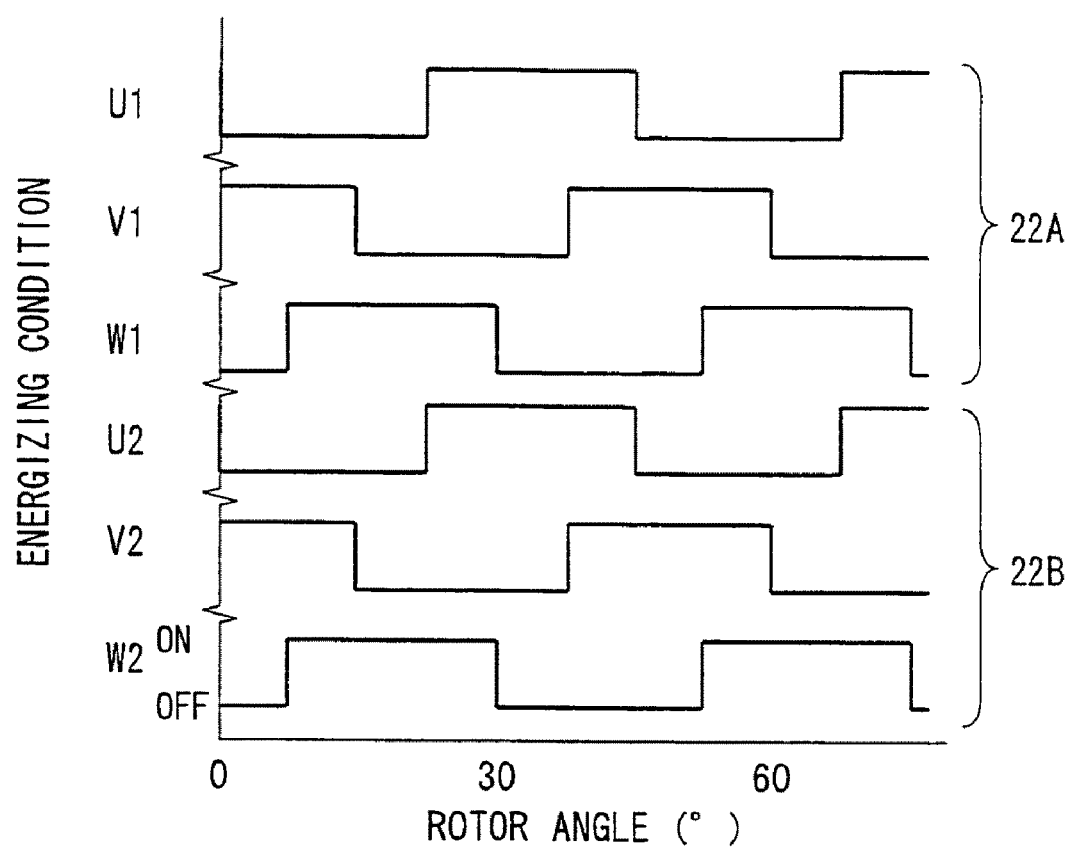
FIG. 15 is a graph showing a relationship between the rotor angle and an energizing condition of the coil in a normal operation, according to the first embodiment.

As shown in FIG. 15, when the rotor 11 is rotated, the ECU 7 turns the first and second switching elements 79a, 79b ON and OFF, so that the coils of the coil device 22 are serially energized to rotate the rotor 11 in accordance with the rotation angle of the rotor 11 and correction terms of delay in magnetization. The rotation angle of the rotor 11 is detected using the encoder 60. Alternatively, the ECU 7 may turn the first and second switching elements 79a, 79b ON and OFF in a manner of an open loop control, so that the coil device 22 may be serially energized to rotate the rotor 11.

The ECU 7 includes various control programs such as a rotor detecting unit 710, a normal control unit 711, a tapping control unit 700, and a reference position recognizing unit 701. The rotor detecting unit 710 detects rotation speed of the rotor 11, the number of rotation of the rotor 11, the rotation angle of the rotor 11, in accordance with the output of the encoder 60, specifically, the first and second rotation angular hall ICs 62A, 62B, and the index hall IC 62Z. The normal control unit 711 controls the electric motor 5 such that the shift range position of a shift range operating unit (not shown), which is operated by the driver, corresponds to the shift range position detected using the ECU 7.

The normal control unit 711 determines control operations of the electric motor 5 such as the rotative direction of the electric motor 5, the number of rotation of the electric motor 5, and the rotation angle of the electric motor 5. The normal control unit 711 determines this control operations of the electric motor 5 in accordance with the shift range position of the shift range operating unit (not shown), which is operated by the driver.

The normal control unit 711 controls electricity supplied to the coil device 22, which has the multiphase structure, in accordance with the determination of the control operations of the electric motor 5. Thus, the normal control unit 711 performs a normal control, in which the rotative direction, the number of rotation, and the rotation angle of the electric motor 5 are controlled. Specifically, when the ECU 7 rotates the electric motor 5, the normal control unit 711 performs a synchronized operation, in which the energizing condition of the coil device 22 having the multiphase structure is switched in accordance with a detection signal such as the rotation angle of the rotor 11 detected using the encoder 60. Thus, the normal control unit 711 controls the rotative direction, the number of rotation, and the rotation angle of the electric motor 5, so that the ECU 7 switches the shift range switching device 3 via the reduction gears 6.

The tapping control unit 700 performs a tapping control in at least one of the following conditions. For example, every time when the operation is started by turning the start switch 720N, when the number of starting the operations increases to a predetermined number, when the shift position is unknown in starting the operation, and when a predetermined learning condition is satisfied, the tapping control unit 700 performs the tapping control.

The tapping control unit 700 terminates the tapping control in at least one of the following conditions. For example, when the tapping control unit 700 performs the tapping control for a predetermined period, when a variation in the rotation angle of the rotor 11 detected using the encoder 60 does not change for a predetermined period, and when the reference position recognizing unit 701 detects the reference position, the tapping control unit 700 terminates the tapping control.

The tapping control unit 700 controls electricity supplied to the electric motor 5 to make the movable member of the shift range switching device 3 come into contact with a limit position on the other side of the movable range. The limit position of the movable range is on the side of the parking position, for example.

In this embodiment, the tapping control unit 700 performs a one side tapping control, in which the rotor 11 is rotated until the rotor 11 makes contact with the limit position on one side such as the side of the parking position, for example. Alternatively, the tapping control unit 700 may perform the one side tapping control to detect the reference position on the one side, subsequently, the rotor 11 may be rotated until the rotor 11 makes contact with the limit position on the other side such as the side of the drive position to detect the reference position on the other side. The tapping control unit 700 may terminate the control after performing both the one side tapping control and the other side taping control.

The reference position recognizing unit 701 performs the tapping control using the tapping control unit 700, thereby learning the position, in which the rotor 11 stops rotation thereof, as one of the reference position (initial position) of the rotor 11 and the reference position (initial position) of the shift range.

Next, an example of a control performed using the ECU 7 is described. The ECU 7 starts this example of the control when the start switch 72 is turned ON, and terminates this example of the control when the control condition is changed to a normal control condition, for example. Both ends of the recessions 46a of the detent plate 46 between the P range and D range have the restriction walls. The hooking portion 47a of the detent spring 47 hooks to the recession 46a of the detent plate 46, so that the restriction walls restrict the electric motor 5 from rotating further the restriction walls.

When the driver turns the start switch 720N, the ECU 7 evaluates whether the storage medium 71 stores information of the shift range when the electricity supply is previously terminated. This evaluation is an example for estimating whether the ECU 7 performs the tapping control. When the ECU 7 makes a positive determination in this evaluation, the ECU 7 sets the present shift range at the shift range where the electricity is previously terminated. Subsequently, the control of the ECU 7 proceeds to the normal control, in which the electric motor 5 is controlled such that the commanded shift range corresponds to the present shift range.

When the present shift range is unknown, that is, the storage medium 71 does not store information of the shift range when the electricity supply is previously terminated, a negative determination is made in the above evaluation. In this case, the ECU 7 operates the tapping control unit 700 to perform the tapping control. Specifically, the ECU 7 forcibly operates the electric motor 5 until the rotor 11 makes contact with the limit position on one side of the P range and the D range. The ECU 7 stores the position, in which the electric motor 5 stops rotation thereof on one side of the P range and D range, as the present shift range, thereby operating the reference position recognizing unit 701 for storing the present shift range in the storage medium 71. Subsequently, the routine proceeds to the normal control.

The ECU 7 performs the tapping control, in which the ECU 7 rotates the rotor 11 until the rotor 11 makes contact with the limit position on the one side. Accordingly, when the hooking portion 47a of the detent spring 47 makes contact with the restriction walls on both sides, a mechanical load arises due to collision therebetween.

Furthermore, the hooking portion 47a of the detent spring 47 urges both the restriction walls of the detent plate 46 due to output torque of the electric motor 5. As a result, mechanical load torque is applied to the components such as the transmission system of the rotation members and the hooking portion between the movable member and the fixed member, specifically, the hooking portion 47a of the detent spring 47, due to the output torque of the electric motor 5. Accordingly, as the number of the tapping control, in which the large load torque is applied, increases, mechanical damage may occur in the components of transmission system and in the hooking portion. As a result, the components of the transmission system and the hooking portion may be gradually deformed and broken.

However, in the above structure of this embodiment, the electric motor 5 includes the first coil group 22A and the second coil group 22B, which are electrically separated from each other. The first coil group 22A has the coils U1, V1, and W1. The second coil group 22B has the coils U2, V2, and W2. The rotor 11 can be rotated by only energizing the coils U1, V1, and W1 of the first coil group 22A or by only energizing the coils U2, V2, and W2 of the second coil group 22B.

Figure 1A:
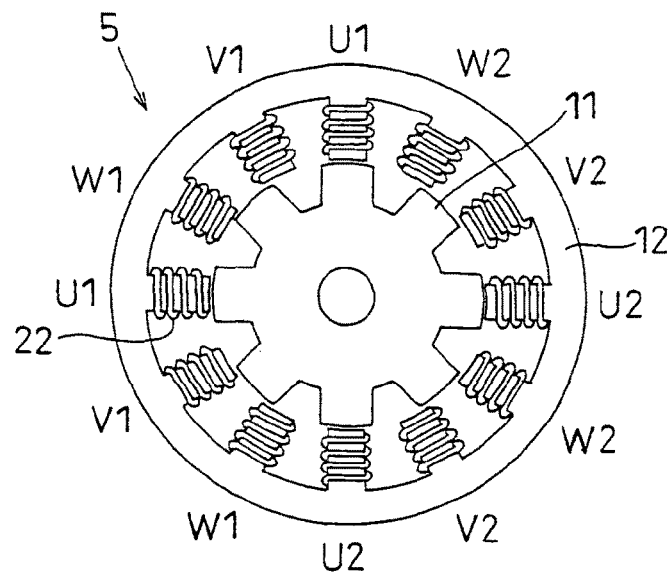
FIG. 1A is a schematic view showing an electric motor.
Figure 1B:
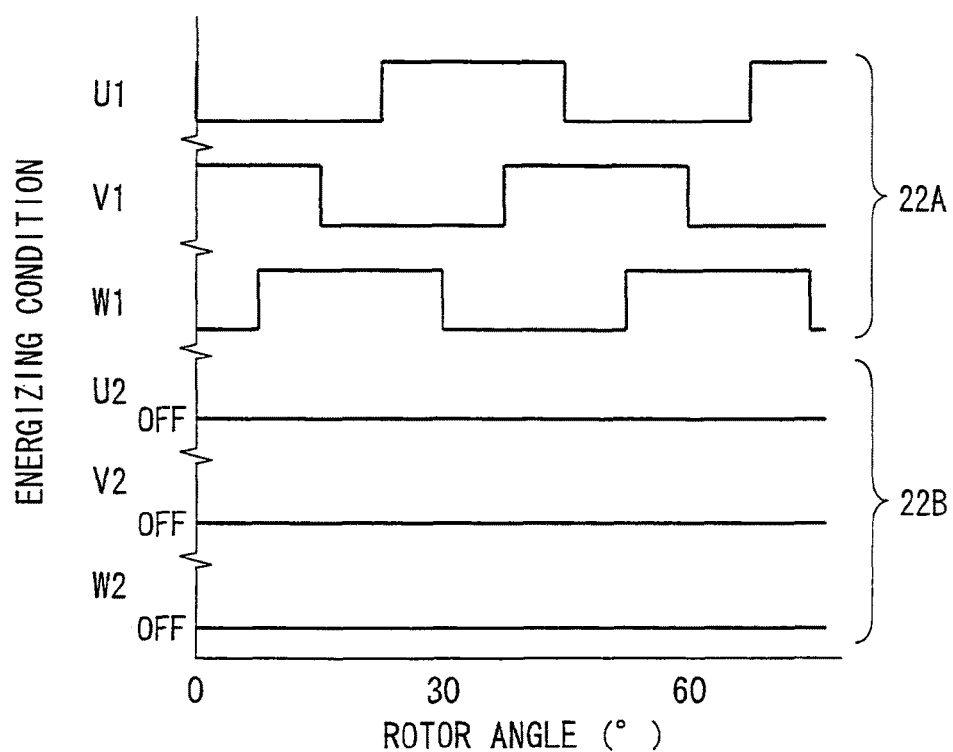
FIG. 1B is a graph showing a relationship between rotor angle and an energizing condition of a coil, according to a first embodiment of the present invention.

As shown in FIG. 1B, the tapping control unit 700 controls to supply electricity only to the coils U1, V1, and W1 of the first coil group 22A for rotating the rotor 11, when the tapping control unit 700 performs the tapping control, for example. As a result, torque output from the electric motor 5 can be reduced in the tapping control compared with torque output in the normal operation of the electric motor 5.

Thus, the mechanical load, which arises when the hooking portion 47a of the detent spring 47 collides against the one restriction wall of the detent plate 46 in the taping control, can be reduced.

The rotor 11 stops in the condition where the electric motor 5 is supplied with electricity, specifically, when the hooking portion 47a of the detent spring 47 collides against the one restriction wall of the detent plate 46 in the tapping control. In this situation, in the above structure, the torque output from the electric motor 5 can be reduced. Therefore, mechanical load torque, which arises in components such as the hooking portion 47a of the detent spring 47 in the transmission system and the hooking portion between the movable member and the fixed member, can be reduced.

In the above structure, when the ECU 7 performs the tapping control, the rotor 11 is rotated by energizing only the coils U1, V1, and W1 of the first system 22A, for example. Thus, the load due to collision arising in the tapping control can be reduced. Specifically, load torque arising in the condition where the hooking portion 47a of the detent spring 47 collides against the one restriction wall of the detent plate 46 can be reduced. Therefore, mechanical damage caused by the tapping control can be reduced.

In this operation, even when the number of the tapping control increases, the components of the transmission system such as the hooking portion 47a and the hooking portion between the movable member and the fixed member can be steadily restricted from being deformed and damaged. Thus, durability and reliability of the shift range switching device can be enhanced.

Second Embodiment

The characteristic of the battery (power source), which supplies electricity to the electric motor 5, may vary in dependence upon the environment of the battery. Specifically, output voltage of the battery and a performance for supplying electricity to the electric motor 5 may vary in dependence upon the environment such as the season. In particular, the variation in the characteristic of the battery is apt to be large in summer and winter. In these cases, output torque of the electric motor 5 may vary due to the variation in output voltage of the power source and the variation in the capacity of the power source for supplying electricity.

Furthermore, the components are not completely rigid members, and may be deformed by applying force. That is, the components are macroscopically spring elements. Accordingly, when the output torque of the electric motor 5 varies, an amount of deformation arising in the components in the tapping control may vary. As a result, the reference position learned during the tapping control may not be constant, and consequently, the variation arising in the tapping control may exert a negative effect to accuracy in the positioning control.

Specifically for example, when voltage applied to the electric motor 5 and a capacity of the battery for supplying electricity to the electric motor 5 increases, output torque of the electric motor 5 may become large. In this condition, when the tapping control is performed, the mechanical load becomes large in the tapping control, in which the hooking portion 47a collides against the restriction wall of the detent plate 46.

Furthermore, load torque becomes large in the condition where the hooking portion 47a of the detent spring 47 collides against the one restriction wall of the detent plate 46. As a result, as the number of the tapping control increases, the number of applying the large load torque increases. Consequently, mechanical damage may occur in the components of the transmission system and in the hooking portion. As a result, the components of the transmission system and the hooking portion may be gradually deformed and broken.

By contrast, when voltage applied to the electric motor 5 and capacity for supplying electricity to the electric motor 5 excessively decrease, output torque of the electric motor 5 decreases. In particular, output torque of the electric motor 5 may decrease by reducing the output torque of the electric motor 5 using a duty control during the tapping control. In this case, the hooking portion 47a of the detent spring 47 may not be capable of getting through the recession 46a of the detent plate 46 due to lack of output power of the rotative actuator 1.

Furthermore, the components are not completely rigid, and may macroscopically be spring elements. Accordingly, when the output torque of the electric motor 5 varies, an amount of deformation arising in the components may vary during the tapping control. As a result, the reference position learned during the tapping control may not be constant, and consequently, the variation during the tapping control may exert a negative effect to accuracy in the positioning control.

Figure 16:
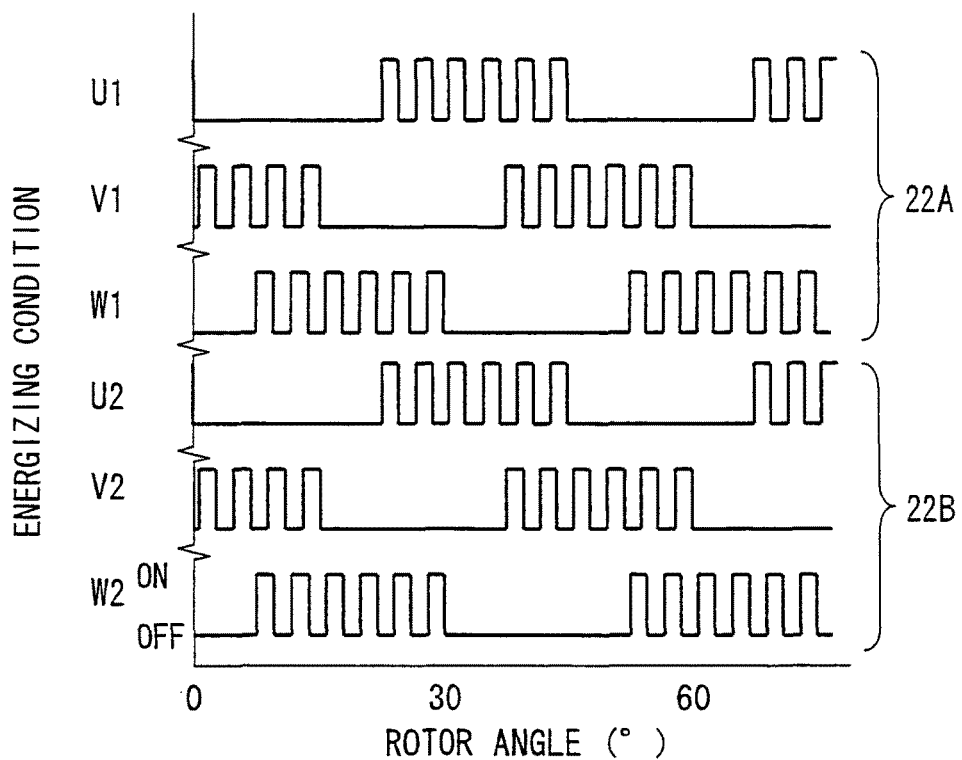
FIG. 16 is a graph showing a relationship between the rotor angle and an energizing condition of the coil, according to a second and third embodiments of the present invention.

In this embodiment, a current sensor (not shown) is provided to an electric circuit for monitoring electric current flowing through the electric motor 5. As shown in FIG. 16, a duty control is performed for electricity respectively supplied to the coils U1, V1, W1, U2, V2, and W2 of the coil device 22 at least when the tapping control is performed. In the duty control, electric current (electric current per unit of time) flowing respectively through the coils U1, V1, W1, U2, V2, and W2 of the coil device 22 becomes substantially constant.

That is, the ECU 7 controls a period, in which the first and second switching elements 79a, 79b are turned ON, in a predetermined period (switching period) in the duty control in accordance with the electric current detected using the electric sensor. Thus, electric current flowing respectively through the coil device 22 is controlled at a substantially constant amount. Specifically, as the amount of the electric current detected using the electric sensor becomes large, the period, in which the first and second switching elements 79a, 79b are turned ON, is controlled to be short in the predetermined period. By contrast, as the amount of the electric current detected using the electric sensor becomes small, the period, in which the first and second switching elements 79a, 79b are turned ON, is controlled to be long in the predetermined period.

The relationship, which is between the electric current detected using the electric sensor, and the period, in which the first and second switching elements 79a, 79b are turned ON, is predetermined and defined using a data map or an arithmetic expression, for example.

In the above structure and operation, the following effects can be produced.

First, the electric current flowing through the coils U1, V1, W1, U2, V2, and W2 of the coil device 22 can be controlled at a substantially constant amount, even when voltage applied to the electric motor 5 and capacity of the battery for supplying electricity to the electric motor 5 increase due to variation in the environment and the condition of the vehicle, particularly in summer. Thus, the variation in output torque of the electric motor 5 can be reduced.

In this operation, the components such as the hooking portion 47a in the transmission system and the hooking portion between the movable member and the fixed member can be steadily restricted from being deformed and damaged during the tapping control due to increase in the output power of the electric motor 5 in dependence upon the environment and condition of the vehicle. Thus, durability and reliability of the shift range switching device can be enhanced.

Second, the electric current flowing through the coils U1, V1, W1, U2, V2, and W2 of the coil device 22 is controlled at a substantially constant amount, even when voltage applied to the electric motor 5 and the capacity of the battery for supplying electricity to the electric motor 5 decrease due to environment such as mid-winter and due to increase in electric resistance in the electric circuit. As a result, output torque of the electric motor 5 can be restricted from decreasing due to the environment and the condition of the vehicle. For example, even when the output torque of the electric motor 5 is reduced using the duty control or the like during the tapping control, the output torque of the electric motor 5 can be maintained to be greater than a predetermined amount. Therefore, the hooking portion 47a of the detent spring 47 can get through the recession 46a of the detent plate 46, so that durability and reliability of the shift range switching device can be enhanced.

Furthermore, when the tapping control is performed, the variation in the output torque of the electric motor 5 can be reduced, so that the variation in the reference position, which is learned during the tapping control, can be reduced. Thus, accuracy in the positioning control can be enhanced.

A voltage sensor may be provided in the electric circuit, instead of the current sensor, for detecting voltage of electricity supplied to the electric motor 5. Battery voltage may be used as the voltage of the electricity supplied to the electric motor 5. The duty ratio of electricity supplied to the magnetic coils 22 can be controlled in accordance with the voltage detected using the voltage sensor.

Third Embodiment

As the rotation speed of the electric motor 5 increases, the output torque of the electric motor 5 is apt to decrease. By contrast, as the rotation speed of the electric motor 5 decreases, the output torque of the electric motor 5 is apt to increase. Therefore, the electric motor 5 generates substantially the maximum torque when the electric motor 5 stops. That is, when the hooking portion 47a of the detent spring 47 collides against the restriction wall of the detent plate 46, and the electric motor 5 stops during the tapping control, the electric motor 5 generates substantially the maximum torque.

Accordingly, as the number of the tapping control increases, mechanical damage may occur in the components of transmission system and in the hooking portion. As a result, the components of the transmission system and the hooking portion may be gradually deformed and broken.

Furthermore, the components are not completely rigid, and may macroscopically be spring elements. Accordingly, when the output torque of the electric motor 5 varies, an amount of deformation arising in the components may vary during the tapping control. As a result, the reference position learned during the tapping control may not be constant, and consequently, the variation during the tapping control may exert a negative effect to accuracy of the positioning control.

In this embodiment, as referred to FIG. 16, a duty control is performed for electricity respectively supplied to the coils U1, V1, W1, U2, V2, and W2 of the coil device 22 in accordance with the rotation speed of the rotor 11 at least when the tapping control is performed. The rotation speed of the rotor 11 is detected using the encoder 60. In the duty control, the output torque of the rotor 11 becomes substantially constant.

That is, the ECU 7 controls the period, in which the first and second switching elements 79a, 79b are turned ON, in the predetermined period (switching period) in the duty control in accordance with the rotation speed of the rotor 11. Thus, the output torque of the rotor 11 is controlled at a substantially constant amount. Specifically, as the rotation speed of the rotor 11 becomes high, the period, in which the first and second switching elements 79a, 79b are turned ON, is controlled to be long in the predetermined period. By contrast, as the rotation speed of the rotor 11 becomes low, the period, in which the first and second switching elements 79a, 79b are turned ON, is controlled to be short in the predetermined period.

The relationship between the rotation speed of the rotor 11 and the period, in which the first and second switching elements 79a, 79b are turned ON, is predetermined and defined using a data map or an arithmetic expression, for example.

In the above structure and operation, the following effects can be produced.

First, as the rotation speed of the rotor 11 becomes high, the amount of electricity supplied to the coil device 22 is increased, and as the rotation speed of the rotor 11 becomes low, the amount of electricity supplied to the coil device 22 is decreased, such that the output torque of the rotor 11 becomes substantially constant. Thus, the output torque of the electric motor 5 can be restricted when the electric motor 5 is stopped in the condition where the electric motor 5 is supplied with electricity.

As a result, the output torque of the electric motor 5 can be restricted in the condition where the hooking portion 47a of the detent spring 47 collides against the restriction wall of the detent plate 47 during the tapping control. Thus, the components such as the hooking portion 47a in the transmission system and the hooking portion between the movable member and the fixed member can be steadily restricted from being applied with mechanical load torque.

In this operation, even when the number of the tapping control increases, the components of the transmission system such as the hooking portion 47a and the hooking portion between the movable member and the fixed member can be steadily restricted from being deformed and damaged. Thus, durability and reliability of the shift range switching device can be enhanced.

Furthermore, the variation in the output torque of the electric motor 5 can be reduced during the tapping control, so that the variation in the reference position, which is learned during the tapping control, can be reduced. Thus, accuracy in the positioning control can be enhanced.

[Variation]

Figure 17:
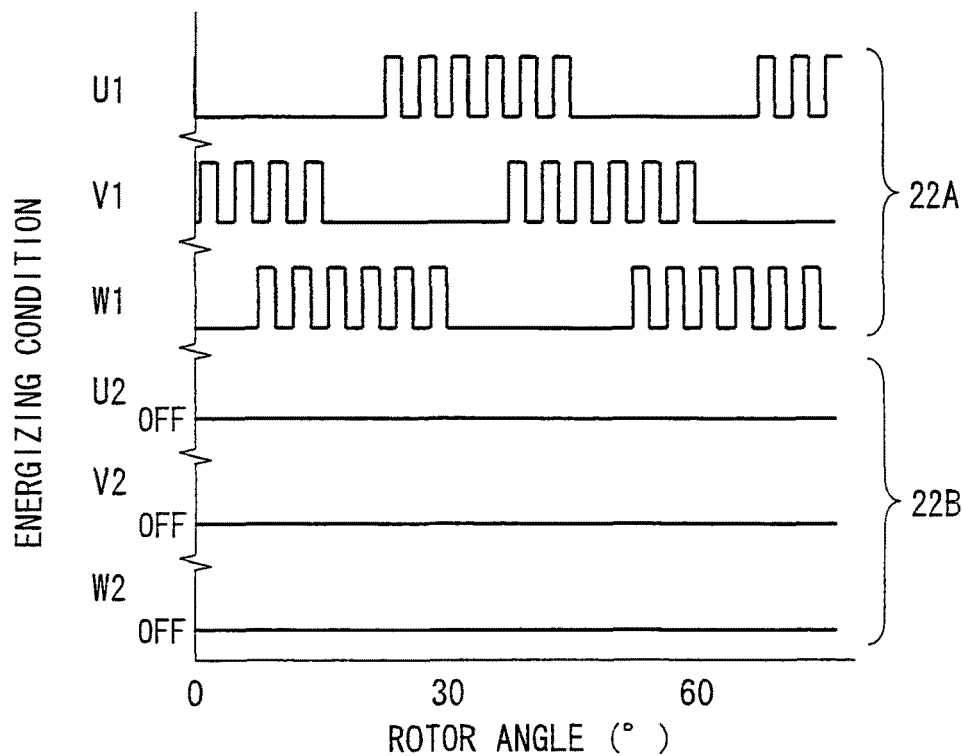
FIG. 17 is a graph showing a relationship between the rotor angle and an energizing condition of the coil, according to an example of an embodiment of the present invention.

The first embodiment can be combined with the second embodiment. Specifically, as shown in FIG. 17, when the tapping control is performed, only the coils U1, V1, and W1 of the first coil group 22A may be supplied with electricity, so that the output torque of the electric motor 5 is reduced. In addition, the duty control may be performed to the electricity respectively supplied to the coil device 22 such that the amount of electricity respectively flowing through the coil device 22 becomes substantially constant.

The first embodiment can be combined with the third embodiment. Specifically, when the tapping control is performed, only the coils U1, V1, and W1 of the first coil group 22A may be supplied with electricity, so that the output torque of the electric motor 5 is reduced. In addition, a duty control may be performed to the electricity respectively supplied to the coil device 22 such that the output torque of the rotor 11 becomes substantially constant.

The second embodiment can be combined with the third embodiment. Specifically, when the tapping control is performed, the duty control may be performed to the electricity respectively supplied to the coil device 22 such that the amount of electricity respectively flowing through the coil device 22 becomes substantially constant. In addition, the duty control may be performed to the electricity respectively supplied to the coil device 22 such that the output torque of the rotor 11 becomes substantially constant.

The first, second, and third embodiments can be combined with each other. Specifically, when the tapping control is performed, only the coils U1, V1, and W1 of the first coil group 22A may be supplied with electricity, so that the output torque of the electric motor 5 is reduced. In addition, the duty control may be performed to the electricity respectively supplied to the coil device 22 such that the amount of electricity respectively flowing through the coil device 22 becomes substantially constant. In addition, the duty control may be performed to the electricity respectively supplied to the coil device 22 such that the output torque of the rotor 11 becomes substantially constant.

The encoder 60 may be omitted. In this structure, the number of supplying electricity respectively to the coil device 22 may be counted, so that the number of rotation of the rotor 11 and the rotation speed of the rotor 11 may be controlled.

The present shift range may be detected using an angular sensor for detecting the angle of the output shaft 17 of the reduction gears 6, instead of detecting the present shift range in accordance with the number of rotation of the rotor 11 and the rotation angle of the rotor 11. In this case, abnormality in the angular sensor can be detected by performing the tapping control.

The electric motor 5 is not limited to the SR motor. Other kinds of reluctance motor such as a synchronous reluctance motor may be used. Other kind of synchronous motor such as a surface permanent magnet (SPM) synchronous motor, and an interior permanent magnet (IPM) synchronous motor may be used. Alternatively, various kinds of motors may be used as the electric motor 5.

The reduction gears 6 are not limited to the inscribed planetary reduction gear (cycloidal gears). A planetary reduction gear constructed of the sun gear 26, planetary pinions, a ring gear, and the like may be used as the reduction gears 6. The sun gear 26 is rotated by the rotor shaft 13. The planetary pinions are arranged along the circumferential periphery of the sun gear 26 at regular intervals. The ring gear engages with the circumferential periphery of the planetary pinion.

The reduction gears 6 may be constructed of the sun gear 26 and a gear train. The gear trains engage with the sun gear 26.

The rotative actuator 1 is not limited to operate the shift range switching device 3, which is an example of the driven object. The rotative actuator 1 may operate other driven object such as a cam phase variable device, which variably changes the advanced phase of the camshaft.

The electric motor 5 is not limited to be combined with the reduction gears 6. The electric motor 5 may directly operate a driven object.

The structure of the above embodiment is an example. Specifically, the angular dimensions and arrangement of the components such as the magnet and the hall ICs may be variously changed.

The above detecting apparatus is not limited for detecting the reference position. The structure of the above detecting apparatus can be applied to various detecting apparatus, which manipulate a member until the member makes contact with an object for detecting a position of one of the member and the object, while mechanical load is reduced between the member and the object, for example.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A reference position detecting apparatus comprising:
an electric motor that includes a first coil group having a plurality of first coils and a second coil group having a plurality of second coils, the first coil group being electrically separated from the second coil group, the electric motor further including a rotor that rotates when at least one of the first coil group and the second coil group is supplied with electricity;
a tapping control unit that performs tapping control in which the rotor is rotated to a limit position on one side in a predetermined range by electricity supplied to one of the first coil group and the second coil group;
a reference position recognizing unit that defines a point at which rotation of the rotor stops during tapping control, as a reference position, and that stores the reference position; and
a normal control unit that performs, after the reference position is stored by the reference position recognizing unit, a normal control in which electricity is supplied to both the first coil group and the second coil group.

2. The apparatus according to claim 1, further comprising:
a motor control unit performs duty cycle control with respect to electricity supplied to one of the first coil group and the second coil group such that an amount of electricity flowing therethrough becomes substantially constant during tapping control.

3. The apparatus according to claim 1, further comprising:
a motor control unit that performs duty cycle control with respect to electricity supplied to one of the first coil group and the second coil group in accordance with speed of the rotor such that output torque of the rotor becomes substantially constant during tapping control.

4. A method for detecting a position in an object, the method comprising:
controlling electricity supplied to one of a first coil group comprising a plurality of first coils and a second coil group comprising a plurality of second coils in an electric motor, the first coil group being electrically separated from the second coil group, to rotate a rotor to a limit position in a movable range of the object;
performing tapping control in which the rotor is rotated to a limit position on one side in a predetermined range by electricity supplied to one of the first coil group and the second coil group;
defining a point at which rotation of the rotor stops during tapping control, as a reference position, and that stores the reference position; and
performing, after the reference position is stored by a reference position recognizing unit, a normal control in which electricity is supplied to both the first coil group and the second coil group.

5. The method according to claim 4, further comprising:
performing duty cycle control with respect to electricity supplied to one of the first coil group and the second coil group such that an amount of electricity flowing therethrough becomes substantially constant during tapping control.

6. The method according to claim 4, further comprising:
performing duty cycle control with respect to electricity supplied to one of the first coil group and the second coil group in accordance with speed of the rotor such that output torque of the rotor becomes substantially constant during tapping control.

* * * * *